United States Patent

Nonaka et al.

[11] Patent Number: 6,025,001
[45] Date of Patent: *Feb. 15, 2000

[54] METHOD FOR PRODUCING BAKERY PRODUCTS

[75] Inventors: Masahiko Nonaka; Yoshiji Adachi; Yasushi Naruto; Chifumi Kaga, all of Kawasaki, Japan

[73] Assignee: Ajinomoto Co., Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/822,500

[22] Filed: Mar. 24, 1997

[30] Foreign Application Priority Data

Apr. 3, 1996 [JP] Japan ..................................... 8-081620

[51] Int. Cl.[7] ...................................................... A23L 3/015
[52] U.S. Cl. ......................... 426/447; 426/118; 426/446; 426/549
[58] Field of Search ..................................... 426/447, 446, 426/549, 523, 113, 118

[56] References Cited

U.S. PATENT DOCUMENTS

| 3,718,483 | 2/1973 | Davis et al. ............................... 99/182 |
| 3,949,934 | 4/1976 | Goglio ..................................... 226/118 |
| 5,290,575 | 3/1994 | Torikata et al. . |
| 5,707,674 | 1/1998 | Andrews .................................. 426/496 |

FOREIGN PATENT DOCUMENTS

| 56-23565 | 6/1981 | Japan . |
| 2-50368 | 11/1990 | Japan . |

*Primary Examiner*—David Lacey
*Assistant Examiner*—Hao Mai
*Attorney, Agent, or Firm*—Oblon, Spivak, McClelland, Maier & Neustadt, P.C.

[57] ABSTRACT

Shaped bodies of dough are expanded under reduced pressure and then subsequently baked under heat, or are baked under heat while being expanded under reduced pressure. There is no substantial final fermentation.

8 Claims, No Drawings

METHOD FOR PRODUCING BAKERY PRODUCTS

BACKGROUND OF THE INVENTION

1. Field of the Invention

The present invention relates to a novel method for producing high-quality bakery products such as bread within a short period of time, from various shaped bodies of dough that comprise flour of food grains such as wheat flour and rye flour.

2. Discussion of the Background Art

A conventional method of producing bakery products such as bread comprises adding water and other additives to wheat flour, further adding thereto baker's yeast and other expanding agents as a gas-generating source suitable to the intended products, then kneading them to produce dough, dividing the resulting dough, optionally after having permitted it to ferment or rise, into plural parts, each having a weight corresponding to the weight of each final product, suitably shaping them to produce shaped bodies of dough, subjecting them to final fermentation, and thereafter baking them to produce bakery products which are supplied to consumers.

The conventional method which is now generally employed on an industrial scale comprises the above time-consuming plural steps. Therefore, it is difficult to carry out this method several times a day in accordance with the real-time sales of products in shops or in accordance with the real-time orders for products from sellers. If the amount of equipment is increased in order satisfy the requirements for such real-time sales or orders, this will result in a decrease in the productivity of the equipment and an increase in equipment costs.

Recently, bakery products have been produced and distributed three times a day to 24-hour-open convenience stores and fast food stores in order to provide consumers with just-baked, high-quality bakery products. For this, if the conventional method of producing bakery products is used, it requires skilled bakery workers to work long hours, thereby making the labor conditions severe.

One effort that has heretofore been made for the controlled production of a variety of bakery products in small quantity is to divide the bakery process into two parts. A first part is carried out in a central factory and comprises kneading raw materials, subjecting the resulting dough to primary fermentation, dividing it into plural parts, shaping the parts into shaped bodies of dough, freezing them and storing the thus-shaped frozen bodies of dough. The second part is carried out in baking branch-factories (shops) and comprises, in accordance with real-time orders received several times a day, thawing the frozen bodies, subjecting them to final fermentation and thereafter baking them to produce final bakery products. In this case, however, the total time for the steps of thawing the frozen bodies of dough and subjecting them to final fermentation reaches several hours under the current thawing and fermenting conditions. Therefore, such a divided bakery process is still problematic in that an amount of thawed and fermented bodies of dough as can meet any unexpected excess demand for the products must be prepared every day and is often lost, and that the process could not smoothly meet an additional order for a small amount of products. Given this situation, it is now desired to drastically improve the conventional process of producing bakery products to shorten the time required for the process.

On the other hand, frozen dough is problematic in that the amount of gas to be derived from the yeast therein is reduced during storage, as a result of which it is often difficult to obtain products having a standard quality in the case where shaped frozen bodies of dough are subjected to a final fermentation after storage. In order to overcome this problem, measures to control the fermentation of the dough are generally taken in a step prior to shaping the dough into shaped bodies. However, such measures often interfere with the formation of the intrinsic components that participate in creating the delicious taste of bakery products, resulting in lower quality bakery products.

SUMMARY OF THE INVENTION

It is an object of the present invention to provide a method of producing high-quality bakery products such as bread, while shortening the time for the conventional bakery process.

The present invention is based upon the discovery that when shaped bodies of dough are not subjected to the conventionally indispensable final fermentation in which the dough is kept at a temperature of from about 27° C. to about 40° C. and at a relative humidity of from about 50% to about 90% for about 30 minutes or longer, thereby pre-expanding the dough due to carbon dioxide generated by the yeast in the dough, but is instead directly expanded to a suitable degree under reduced pressure and then baked by any desired heating means, or baked while being expanded in such condition, then high-quality final bakery products can always be obtained within a short period of time.

Accordingly, the present invention provides a method for producing bakery products such as bread, in which shaped bodies of dough are, without being subjected to substantial final fermentation, expanded under reduced pressure and then subsequently baked under heat, or baked under heat while being expanded under reduced pressure.

The phrase "without being subjected to substantial final fermentation" as used herein means that the method of the present invention does not substantially have the step of so-called final fermentation that is indispensable in the conventional bakery process.

The present invention applies to any type of bakery products, in which various shaped bodies of dough formed by ordinary dough-shaping steps (including those filled in various types of baking containers which may be often referred to as bread-baking cases) are introduced into an atmosphere having a pressure lower than the pressure at the time when the dough was shaped, by which step the shaped bodies of dough are expanded in only a few seconds to several minutes. In contrast, in the conventional bakery process the shaped bodies of dough are expanded through final fermentation and primary baking that takes a relatively long period of time of from 30 to 90 minutes or so. By use of the method of the present invention, not only is the time necessary for the production of bakery products shortened, but the expansion of the shaped bodies of dough can be controlled to any desired degree by varying the degree of reduced pressure to be applied to the shaped bodies of dough. Thus, even frozen shaped bodies of dough can always be baked into high-quality bakery products.

DETAILED DESCRIPTION OF THE PREFERRED EMBODIMENTS

Any and every dough which may be used in producing any type of bakery products is employable in the present invention. The dough may consist essentially of flour of food grains (such as ordinary wheat flour, rye flour, non-fractionated whole wheat flour, etc.), water, baker's yeast or any other expanding agents acceptable as food additives (such as sodium bicarbonate, etc.) and salt, and may comprise various additives, such as various oils and fats, saccharides (e.g., oligosaccharides, polysaccharides), enzymes, emulsifiers, inorganic salts and others. The conditions for kneading the raw materials to produce dough prior to shaping, those for fermenting the obtained dough, the weight of each portion of dough to be shaped, the method of dividing the dough into plural portions, and the method of shaping the thus-divided dough into shaped bodies may be freely determined, depending on the intended properties of the products to be obtained.

In general, in the case where frozen shaped bodies of dough capable of being stored for a long period of time are prepared, some means of controlling the total fermentation of the dough prior to shaping the dough has been employed in the conventional bakery process. The method of the present invention does not require such controlling means. Even in the absence of controlling means, the shaped bodies of dough can be fully fermented according to the method of the invention. Specifically, the method of the present invention does not substantially have a step of keeping shaped bodies of dough at a temperature of from about 27° C. to about 40° C. and at a relative humidity of from about 50% to about 90%, thereby expanding them two times or more due to carbon dioxide generated by the yeast in the dough, said step being for final fermentation of the shaped bodies of dough and being indispensable in the conventional bakery process.

However, one embodiment of the method of the present invention may comprise a step of keeping shaped bodies of dough at a temperature of from about 20° C. to about 40° C. at a relative humidity of from about 50% to about 90 for about 10 minutes or less prior to expanding said shaped bodies of dough under reduced pressure, essentially for the purpose of broadening the variations in the taste and the savoriness of the final bakery products, this optional step, however, being substantially different from the final fermentation step in the conventional bakery process. This embodiment is effective for obtaining a variety of high-quality bakery products while realizing the substantial time-saving results of the method of the invention.

The range of the absolute reduced pressure applicable to the shaped bodies of dough being processed according to the method of the present invention may fall between 150 mmHg and 650 mmHg, preferably between 250 mmHg and 500 mmHg. If a reduced absolute pressure lower than 150 mmHg is applied for even a short period of time, the final products would not have a structure capable of resisting their own weight and the surfaces of the shaped bodies of dough being processed would be too dry, thereby deteriorating the quality of the crust of the final products. If, on the other hand, a reduced absolute pressure higher than 650 mmHg is applied thereto, the shaped bodies of dough being processed would not be expanded sufficiently, resulting in a reduced volume of the final products which, additionally, would not have a fine-grained texture.

Needless to say, the pressure of the atmosphere to be applied to the shaped bodies of dough being processed according to the method of the present invention is not always required to be constant throughout the steps of the method, but may be suitably or desirably controlled to be optimum, depending on the behavior of the shaped bodies of dough being processed. However, the pressure in the baking device where shaped bodies of dough are processed according to the method of the invention must be restored to nearly atmospheric pressure before the final products obtained are taken out. This is for the purpose of preventing the final products taken out of the baking device from being deformed due to any rapid variation (increase) in pressure.

Regarding the timing for reducing the pressure in the baking device, the pressure may be reduced prior to the step of heating the shaped bodies of dough in the device or, alternatively, it may be reduced while heating them. In either case, the way to reduce the pressure may be suitably determined depending on the baking device employed and the type of the bakery products to be produced. Regarding the means of attaining the pressure reduction, any known suction pumps or cylinders may be employed without limitation.

Basically, any and every heating means is employable in the method of the invention except internal heating means such as microwave heating means. All heating methods that are generally used for ovens in ordinary bakery production may effectively be used in the present invention. Namely, shaped bodies of dough can be heated with direct electric heat or gas combustion heat or with various heat regenerators or radiators that heat them indirectly via such electric heat or gas combustion heat. The reason why internal heating means are not employed in the present invention is because they do not permit the surfaces of the shaped bodies of dough to attain a high temperature (130° C. or higher), resulting in failure to produce final bakery products having good crusts.

Not only a single heating means may be used, but also a combination of plural heating means, for example a hot plate producing conductive heat and an electric heater with a fan producing convection heat. In any case, it is desirable to suitably control the heating conditions, depending on the bakery products to be produced and on the pressure-reducing conditions employed.

In order to further improve the quality of the bakery products to be produced, steam may be introduced into the baking device during heating of the shaped bodies of dough. The introduction of steam may be used for producing, for example, bread and rolls with crispy crusts such as typically French bread and rolls.

Further, it is desirable that the expansion and baking under heat of shaped bodies of dough is conducted in a highly-airtight, pressure-reducible baking container having high thermal conductivity and high radiation efficiency.

EXAMPLES

Now, the present invention is described in detail hereinunder with reference to the following examples, which are not intended to restrict the scope of the invention.

Example 1

Production of Hard Rolls

The formulation of dough for hard rolls is shown in Table 1 below.

TABLE 1

| formulation of Dough | |
|---|---|
| High-gluten Flour | 2000 g |
| Raw Yeast | 60 g |
| Salt | 40 g |
| High-quality White Sugar | 40 g |
| Skim Milk | 40 g |

TABLE 1-continued

| formulation of Dough | |
|---|---|
| Shortening | 40 g |
| Eskimo Blue (improver) | 20 g |
| Water | 1290 g |

The above-mentioned components except shortening were put into a 20-quart mixer bowl and kneaded using a mixer (produced by Kanto Mixer Industrial Co.) for 3 minutes at a low mixing speed, for 4 minutes at a middle mixing speed and for 1 minute at a high mixing speed. Shortening was then added to the resulting mix, which was further kneaded for 3 minutes at a low mixing speed, for 4 minutes at a middle mixing speed and for 2 minutes at a high mixing speed. After that, the resulting dough was fermented in a fermenter at 27° C. and at a relative humidity of 80% for 60 minutes, then divided into raw dough balls of 70 g each and shaped to produce raw hotdog rolls using a molder.

One hotdog roll was immediately put on a plate, which was then put into a pressure-reducible heating chamber (Vacuum Oven VOS-300SD, produced by Tokyo Rika Kiki Co. Inc.) that had been previously set at 200° C, and the chamber was closed. Immediately after that, the pressure in the chamber was linearly reduced to an absolute pressure of 260 mmHg within 30 seconds, using a suction valve, which was then closed. After the reduced condition had been held for 8 minutes, a leak valve was gradually opened and the pressure was thus gradually restored to atmospheric pressure over a period of 3 minutes. Next, after further heating for 1 minute, the final baked product was obtained.

As a control, the same shaped dough as above was subjected to final fermentation in a fermenter at 35° C. and at a relative humidity of 75% for 50 minutes, and then baked in a deck oven Prince oven, produced by Fujisawa Co.) at 200° C. for 12 minutes.

The two samples thus baked were compared with respect to their specific volume, the degree of porosity in their crumbs and their taste, resulting in the assessment that the two were almost comparable to each other.

On the other hand, another sample of the raw shaped dough roll was, immediately after having been shaped, left in a fermenter at 27° C. and at a relative humidity of 75% for 10 minutes, then put on a plate and baked under reduced pressure in the same manner as above to obtain a baked product. The quality of the product was found to be comparable to that of the control sample produced according to the conventional bakery process, and was also comparable to that of the previous product baked under reduced pressure. This product was examined in detail, which revealed that it was superior in that its specific volume was higher and that it had softer and tastier crumbs.

Still another sample of the raw shaped dough roll was directly put into a high-performance freezer at −45 ° C. and frozen therein over a period of 20 minutes to produce a frozen dough roll. This was stored in a freezer at −20° C. for 1 week and then thawed, using a microwave thawing oven for industrial use (produced by Matsushita Electric Industry Co.), for 4 minutes at an output power of 70 W. The thus thawed sample was then expanded under reduced pressure and baked in the same manner as above. The quality of the baked product thus obtained was almost comparable to that of the control product.

Example 2
Production of Loaves of Bread

The same dough as in Example 1 was prepared and divided into plural portions of 210 g each. These were separately rounded, shaped using a molder and put into bread-baking cases of the type used for baking beurre manié dough to produce a loaf of bread of 1800 g. Each case was provided with a heat-resistant packing seal to ensure its air-tightness, and was provided with a fine needle valve. Each of six such bread-baking cases was filled with the shaped dough and sealed. Then the absolute pressure in each case was reduced to 310 mmHg over a period of 1 minute via the valve, after which the valve was closed.

Next, the dough in each case was baked in a deck oven (this is a bakery oven generally used in ordinary bakery production, and was used for baking the control sample in Example 1), at 210° C. for 35 minutes. Thereafter, the needle valve was gradually reopened for further 10 minutes to restore the pressure in the oven to atmospheric pressure. The thus baked loaves of bread were almost comparable to commercially available loaves of bread in every point of quality.

ADVANTAGES OF THE INVENTION

As has been described hereinabove, the method of the present invention includes the step of expanding shaped bodies of dough under reduced pressure and baking them under heat, without subjecting shaped bodies of dough to the final fermentation which is indispensable in the conventional bakery process and which is a time-consuming step. This gives bakery products such as bread good taste and savoriness with a shortened preparation time.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of United States is:

1. A method for producing bakery products, comprising the steps of:
    creating shaped bodies of dough, said bodies of shaped dough being yeast-leavened;
    expanding said shaped bodies of dough at a pressure less than atmospheric pressure;
    baking said shaped bodies of dough; and
    performing said method without subjecting the shaped bodies of dough to final fermentation, wherein final fermentation is defined as keeping dough at a temperature from about 27° C. to about 43° C. and at a relative humidity of from about 50% to 90% for about 30 minutes or longer.

2. The method as claimed in claim 1 wherein said baking step is performed subsequent to said expanding step.

3. The method as claimed in claim 1 wherein said baking step and said expanding step are performed substantially at the same time.

4. The method as claimed in claim 1, wherein said expanding step is performed at an absolute pressure of from 150 mmHg to 650 mmHg, including the step of gradually restoring the pressure to atmospheric pressure before the end of the baking step.

5. The method as claimed in claim 1, wherein said expansion and baking steps are performed in an airtight, pressure reducible baking container.

6. The method as claimed in claim 1, wherein said shaped bodies of dough are thawed bodies of previously shaped and frozen dough.

7. The method according to claim 1, further comprising the step of keeping said shaped bodies of dough at a temperature between approximately 20° C. to approximately 40° C. at a relative humidity of approximately 50% to approximately 90% for approximately 10 minutes or less prior to said step of expanding.

8. A method for producing bakery products, comprising the steps of:

creating shaped bodies of dough, said bodies of shaped dough being yeast-leavened;

keeping said shaped bodies of dough at a temperature between approximately 20° C. and approximately 40° C., at a relative humidity between approximately 50% to approximately 90% for approximately 10 minutes or less;

expanding said shaped bodies of dough at a pressure less than atmospheric pressure;

baking said shaped bodies of dough; and performing said method without subjecting the shaped bodies of dough to final fermentation, when final fermentation is defined as keeping dough at a temperature from about 27° C. to about 43° C. and at a relative humidity of from about 50% to 90% for about 30 minutes or longer.

* * * * *